United States Patent [19]

Kondrollochis

[11] 4,100,405

[45] Jul. 11, 1978

[54] PHOTO-ELECTRIC SCANNER FOR LINE FOLLOWING DEVICES

[76] Inventor: Michael Kondrollochis, 4 Nightingale Rd., Woodley, Berkshire, England

[21] Appl. No.: 756,422

[22] Filed: Jan. 3, 1977

[51] Int. Cl.² ............................................. G05B 1/00
[52] U.S. Cl. .................................. 250/202; 250/236
[58] Field of Search .................. 250/202, 235, 236; 318/577

[56] References Cited

U.S. PATENT DOCUMENTS

| | | | |
|---|---|---|---|
| 3,209,152 | 9/1965 | Brouwer | 250/202 |
| 3,322,953 | 5/1967 | Zuckerbraun | 250/235 X |

FOREIGN PATENT DOCUMENTS

| | | | |
|---|---|---|---|
| 1,365,195 | 8/1963 | France | 250/202 |

*Primary Examiner*—James B. Mullins
*Attorney, Agent, or Firm*—Wenderoth, Lind & Ponack

[57] ABSTRACT

A scanning mechanism for tracing an outline and transmitting signals to a control mechanism of, for example, a cutting machine includes a photo-electric cell which is movable in an elliptical orbit by an electro-magnetic drive. The cell is mounted within a housing which mounts optical means for casting an image of the object to be scanned on to the cell.

8 Claims, 6 Drawing Figures

PHOTO-ELECTRIC SCANNER FOR LINE FOLLOWING DEVICES

BACKGROUND OF THE INVENTION

This invention relates to scanning mechanisms wherein a photo-electric cell is moved in an orbit as it follows the path of a line or an edge of an article. Such mechanisms are employed to trace an outline and transmit signals to the control mechanism of a cutting machine, for example, to cause the cutting machine to produce a cut in correspondence with the path followed by the mechanism.

SUMMARY OF THE INVENTION

In accordance with the present invention a scanning mechanism comprises a housing, a support member carrying a photo-electric cell mounted within a housing and movable to allow the cell to move in an elliptical orbit, magnetic means secured to the support and positioned within a field producible by electro-magnetic means also mounted within the housing, the electro-magnetic means being such that on energisation by a power supply it produces a moving field thereby producing movement of the magnetic means and the cell in the elliptical orbit, and optical means in a wall of the housing to cast an image of an object outside the housing on the cell.

The magnetic means mounted on the support may be either a permanent or/an electro-magnet. Preferably, the support is resiliently mounted or is itself, in part at least, resilient to produce a restoring force on the magnetic means resistant to the field force of the electro-magnetic means.

BRIEF DESCRIPTION OF THE DRAWINGS

Embodiments of the invention will be more particularly described, by way of example, with reference to the accompanying drawings wherein.

DETAILED DESCRIPTION OF THE INVENTION

Figure 1:
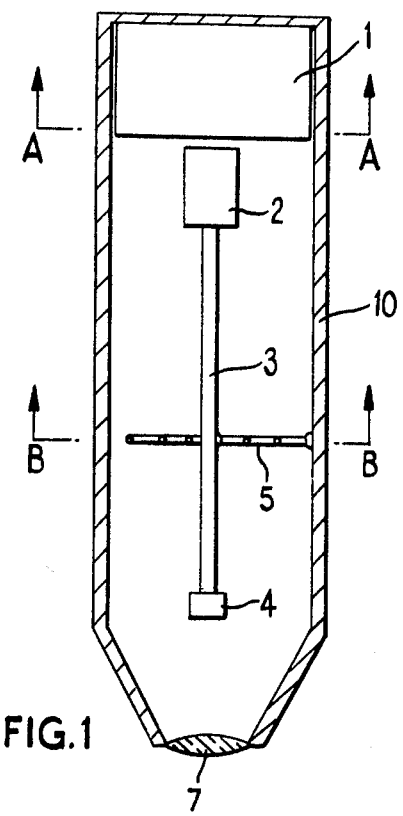
FIGS. 1, 1A and 1B are respectively a longitudinal section and cross-sections taken along lines A—A and B—B FIG. 1 of a scanning mechanism according to the invention.
Figure 1A:
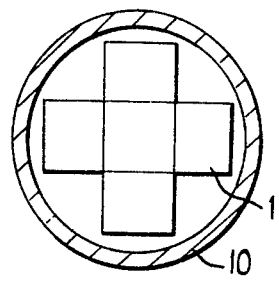
Figure 1B:
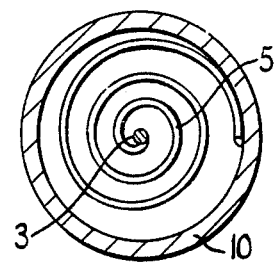

As shown in FIG. 1, a scanning mechanism comprises a tubular housing 10 having an objective lens system 7 at one end thereof to focus images of objects located outside the housing on to a photo-electric cell 4. The cell 4 is secured to one end of a stiff rod 3 which supports a permanent or electro-magnet 2 at its other end. Intermediate its ends the rod is mounted within the housing by a flat spiral spring 5 attached to the rod and the housing wall. The spring allows resilient movement of the rod about a pivot point at its point of attachment so that the ends carrying the cell and the magnet can move in any direction in planes perpendicular to the optical axis of the lens system which is co-axial with the rod in its rest position.

The polar axis of the magnet 2 is parallel with the lens system axis and lies within a field producable by a group of electro-magnets 1 within the housing which also have a polar axis parallel with the lens system axis. The magnets 1 are connectable by leads (not shown) to a remote power supply which is capable of energising the magnets to produce a rotating elliptical field in a plane normal to their polar axis. Thus when the power supply is switched on the field of magnets 1 and, thus, the magnet 2 and correspondingly the cell 4 trace out orbits of elliptical shape in planes normal to the optical axis of the lens system. In this manner an object, i.e. a line, imaged by the lens system is elliptically scanned by the cell.

Figure 2:
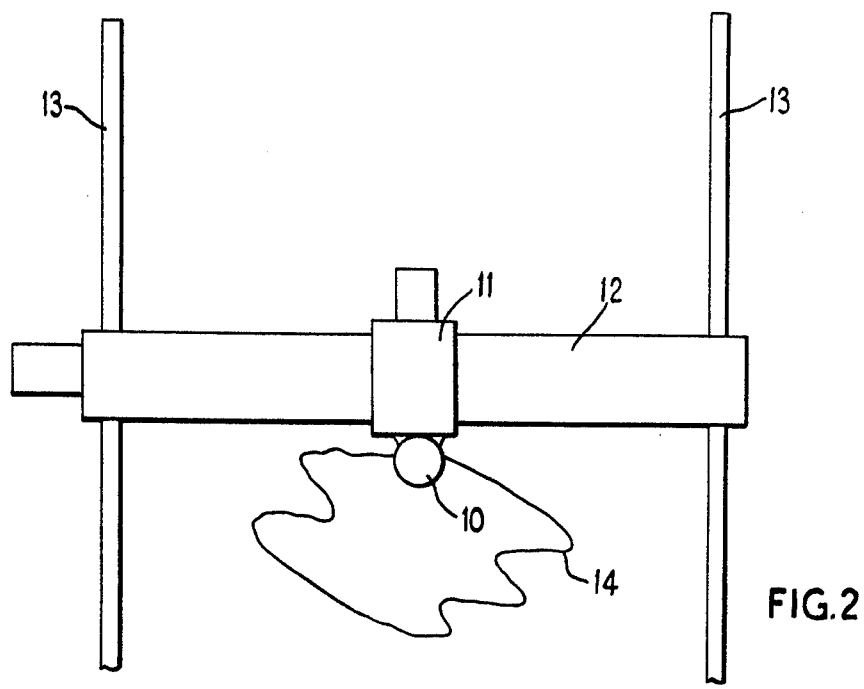
FIG. 2 shows diagrammatically a tracing machine embodying the scanning mechanism.

The mechanism 10 thus described may be mounted (as shown in FIG. 2) on a carriage 11 carried by a bridge 12 supported by rails 13 at right angles to the bridge. Drive motors (not shown) controlled by conventional control/gear are employed to move the bridge and carriage so that the mechanism 10 traces the path of a line or the edge of an object 14 which is then scanned by the cell 4, in its elliptical orbit. Signals produced by the cell may be fed through suitable leads to a cutting machine or other mechanism required to copy or reproduce the shape of the line or object.

Figure 3:
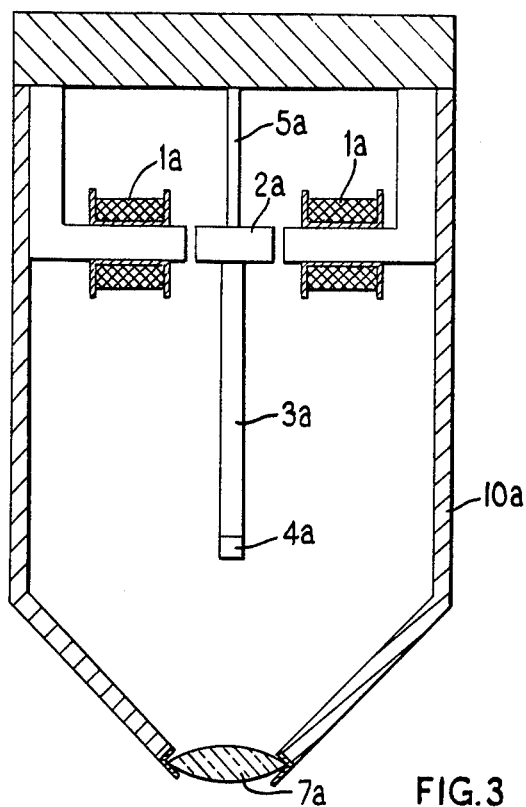
FIG. 3 shows a longitudinal section of another form of scanning mechanism according to the invention, and, FIG. 4 shows a cross section of the mechanism shown in FIG. 3.
Figure 4:
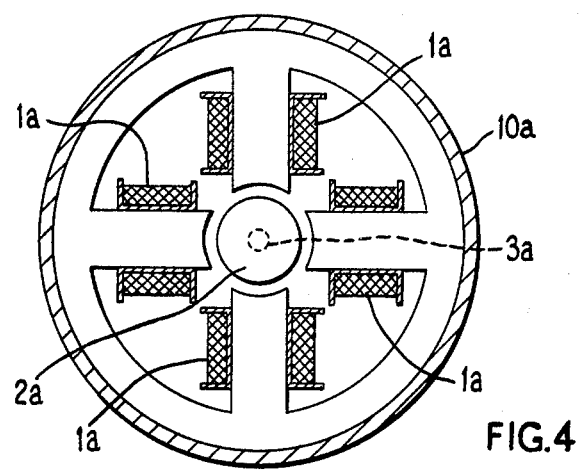

The mechanism shown in FIGS. 3 and 4 includes a housing 10a and a lens system 7a as in the previous embodiment. A photo-electric cell 4a is mounted within the housing at one end of a rod 3a which is supported at its other end by an elongated spring member 5a attached to the housing so that the rod is movable resiliently with respect to the optical axis of the lens system which intersects the cell and is colinear with the rod axis when the spring is undisturbed.

An electro- or permanent magnet 2a is carried by the rod so that it lies within the field of electro-magnetic coils 1a which are energisable by an external source to produce an elliptical rotating field force in a plane perpendicular to the lens system axis whereby the cell is provided with an elliptic orbit for scanning objects imaged by the lens system as in the previous embodiment.

Such a mechanism may be substituted for that shown in FIG. 1 in the machine shown in FIG. 2 and operated as previously described.

What I claim is:

1. A scanning mechanism comprising:
    a housing;
    a support member carrying a photo-electric cell mounted within said housing and movable to allow said cell to move in an elliptical orbit;
    electro-magnetic means mounted within said housing;
    magnetic means secured to said support and positioned within a moving field producible by said electro-magnetic means, such that on energisation of said electro-magnetic means by a power supply said moving field thereby causes movement of said magnetic means and said cell in said elliptical orbit; and
    optical means mounted in a wall of said housing to direct an image of an object located outside said housing onto said cell.

2. A scanning mechanism according to claim 1, wherein said magnetic means comprises an electro-magnet capable of producing a constant field.

3. A scanning mechanism according to claim 1, wherein said electro-magnetic means comprises a plurality of electro-magnets equally spaced around said magnetic means.

4. A scanning mechanism according to claim 1, wherein said support member is resiliently carried by said housing.

5. A scanning mechanism according to claim 4, wherein said support member comprises a straight rod having said cell at one end thereof and said magnetic means at the other end thereof.

6. A scanning mechanism according to claim 5, wherein said rod is carried intermediate its ends by a flat spiral spring.

7. A scanning mechanism according to claim 5, wherein said rod is carried by a longitudinal spring attached to the end of said rod carrying said magnetic means.

8. A scanning mechanism according to claim 1, wherein in the absence of a field produced by said electro-magnetic means said cell lies in the optical axis of said optical means.

* * * * *